Sept. 13, 1932.  G. CLAUDE  1,877,716

GAS DISCHARGE LIGHT

Filed March 31, 1931

INVENTOR
GEORGES CLAUDE

BY HIS ATTORNEYS
Bohleber + Ledbetter

Patented Sept. 13, 1932

1,877,716

UNITED STATES PATENT OFFICE

GEORGES CLAUDE, OF BOULOGNE SUR SEINE, FRANCE, ASSIGNOR TO CLAUDE NEON LIGHTS, INC., OF NEW YORK, N. Y., A CORPORATION OF NEW YORK

GAS DISCHARGE LIGHT

Application filed March 31, 1931, Serial No. 526,607, and in France April 3, 1930.

The invention relates to devices for producing or creating an electric discharge in gases or vapors or mixtures thereof such as in luminous discharge tubes. In such devices it is advantageous to reduce the drop of potential at the cathode which is known as the cathode drop and the incandescent cathode is one device or means which may be used to that end. It is necessary, however, to expend a certain amount of energy in order to bring the cathode to and maintain it at incandescence. In the interest of efficiency and economy in the operation of the device, it is desirable to keep the amount of energy so used as low as possible.

It is an object of the present invention to place an electrode designed to operate as an incandescent cathode or, to be more precise, any active part of an electrode designed to operate as an incandescent cathode, inside a kind of furnace, or to thermally insulate the cathode or, more generally, to utilize any device designed to reduce the heat losses of the cathode or of the active part of the cathode, either by conduction, convection or radiation.

Another object of the invention is to separate by a conductor having a large or greater thermal capacity, the part or parts of the cathode which are to be brought to incandescence from the wires or conductors which serve for the passage of the current to the cathode and are sealed in the glass of the discharge device. This conductor is either unprotected or protected to a lesser extent than the active part of the cathode against heat losses, and is designed in shape and dimensions and is made of a material which prevents the wires or conductors passing through the glass and to the cathode from being brought to incandescence when the device or luminous discharge tube is operating.

The invention also has for an object the conservation of substances having great thermionic emitting power deposited on the active part of the cathode. The active part of the cathode, which is preferably composed of several geometrically distinct conductors, is hollow or more generally has cavities in which the electric field is null or at least very low, as is the case inside the device known under the name of Faraday's cylinder. Electrons or ions can issue from a cathode so arranged and constructed and probably do issue by diffusion and by thus reducing the electric field in the neighborhood of the active layer the disintegration of said layer is reduced, probably by diminishing the acceleration of the positive ions hurled at the cathode.

Furthermore, by using a cathode, the active part of which has a low thermal capacity, constructed in accordance with the above mentioned principles, it is possible to bring this electron emitting portion of the cathode to incandescence almost instantaneously by means of a discharge between the cathode and an auxiliary electrode positioned at a short distance therefrom or adjacent thereto. Another object of the invention is to initially heat the incandescent cathode by means of the discharge from an auxiliary electrode.

Other objects of the invention will be apparent from the following description, taken in connection with the accompanying drawing, illustrating certain embodiments of the invention, in which.

Figure 1:
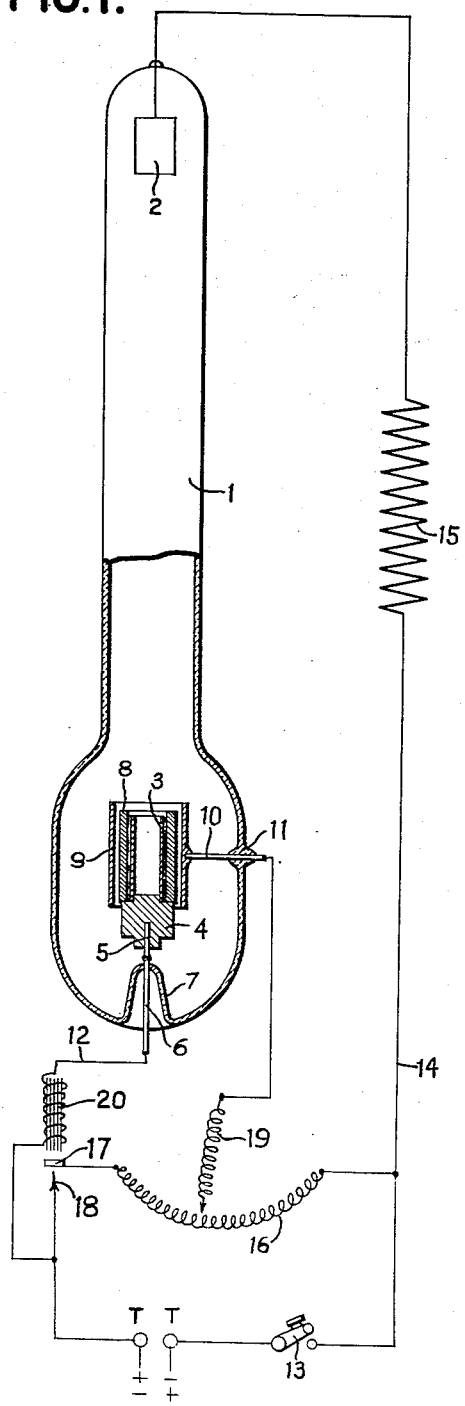
Figure 1 shows a luminous tube with the hot cathode constructed in accordance with the invention and also shows one form of electrical connection to the auxiliary cathode.

The discharge device or luminous discharge tube consists of the tube or envelope 1 having an anode or electrode 2 at one end thereof. At the other end of the tube 1 is located the hot cathode 3 which is preferably a thin walled cylinder made of some refractory metal, such as nickel. The internal surface of the cylinder may be covered with a material having great thermionic emitting power, many of which materials are known and will not be enumerated. The cathode 3 is supported by or rests upon a relatively massive conducting saddle or supporting member 4 which has a high thermal capacity. The thermal capacity of the supporting member 4 is increased if this member is large in size or relatively massive. The conducting wire 5 of nickel is attached or threaded to the supporting member 4 and a tungsten wire 6 is in turn attached to the nickel wire 5 which tungsten wire is carried through the wall and the press 7 of the tube.

The cathode 3 is completely surrounded by a refractory material, such as quartz, which may take the form of a cylinder 8. The cylindrical member 8 in being of a refractory material is highly resistant to heat conduction and consequently the cathode when heated tends to retain its heat since it cannot readily be radiated or conducted through the refractory material of the cylinder 8. The cathode 3 is therefore somewhat in the form of a furnace. The refractory cylinder 8 may be and is shown as being supported upon the saddle or supporting member 4.

An auxiliary electrode 9 is provided adjacent to the cathode 3. In the preferred construction, the auxiliary electrode is cylindrical in form and surrounds the cathode 3 and the refractory cylindrical member 8. The auxiliary electrode 9 therefore serves also as a heat resisting cylinder, although to a much lesser degree than the refractory cylinder 8. The auxiliary electrode 9 is independently supported, such as by the lead-in wire 10 passing through the press 11 provided for that purpose in the wall of the tube 1 which press affords sufficient support for the auxiliary electrode 9.

The incandescent cathode 3 is connected to the terminals T which are in turn connected to a source of electrical potential. The cathode 3 is connected to one terminal by the wire 12 and the anode 2 is connected to the other terminal through a switch 13 which in turn is connected by a wire 14 to a resistance 15 and then to the anode 2. The auxiliary electrode 9 is connected to one of the terminals T through a novel construction which will now be described. A resistance 16 is connected at one end to the wire 14 and the other end is connected to the other terminal T through a contact switch 17 and contact member 18, the purpose of which will be described hereinafter.

This resistance or potentiometer shunts the tube 1. The auxiliary electrode 9 is connected with an arm 19 which has a sliding contact with the resistance or potentiometer 16. By adjusting the position of the arm 19 in contact with the resistance 16, the potential applied to the auxiliary electrode 9 can be controlled at will.

One of the functions of the auxiliary electrode 9 is to initially raise the temperature of the cathode 3 to incandescence in order to start the tube. It will be observed that the resistance 16 shunts the tube 1 and as soon as the switch 13 is closed would draw a current of electricity which normally would be wasted when the tube is in operation. This current through resistance 16 is needed only when it is desired to light or start the tube. For this reason an automatic switch has been provided to break the circuit through the entire resistance 16 so that the current cannot flow therethrough after the tube is lighted. This automatic switch includes the contact switch 17 which is resiliently held in engagement with the contact member 18. The switch contact 17 serves as the armature for an electro-magnet 20 connected in series with the incandescent cathode 3. Now when the tube is lighted or started so that a current flows between the anode 2 and the cathode 3, this current passes through the coil of the electro-magnet 20 and energizes it so that the armature 17 is attracted thereby which breaks the circuit through the resistance 16. This automatic switch is so adjusted that the discharge current between the auxiliary electrode 9 and the cathode 3 is not sufficient to actuate the automatic switch. The current through the entire resistance 16 is therefore interrupted as soon as a current flows between the anode 2 and cathode and continues to be broken or interrupted so long as the tube continues to operate.

In order to start the tube the switch 13 is closed which connects the electrical potential from one of the terminals T to the anode 2 and from the other terminal to the cathode 3. The electrical potential is also applied to the auxiliary electrode 9 through the resistance 16 and arm 19 upon closing of the switch 13. The potential upon the auxiliary electrode 9 can be adjusted by sliding the arm 19 along the resistance 16. The potential is increased if it is swung to the right from the position shown in Figure 1 and decreases when slid or swung to the left along the resistance 16. If the tube does not start upon closing of the switch 13, the sliding contact arm 19 is slid to the right along the resistance 16 thereby increasing the potential upon the auxiliary electrode 9. Since the auxiliary electrode 9 is relatively close to the cathode 3, it will be clear that a much lower potential will operate the discharge between the cathode 3 and the auxiliary electrode 9 than will start the discharge between the anode 2 and the cathode 3.

Upon the discharge occurring between the auxiliary electrode 9 and the cathode 3, the latter heats almost immediately to incandescence which gives rise to emission, reduces the cathode drop and reduces the potential at which the discharge will take place between the anode 2 and the now incandescent cathode 3 so that the discharge starts therebetween.

The path of the discharge current is through the switch 13 and wire 14 as well as the resistance 15 to the anode 2. From the anode 2 the discharge passes through the conducting medium within the tube such as one of the rare gases, or a vapor, such as mercury vapor, or mixtures of these, to the incandescent cathode 3 and then through the supporting member 4, the wires 5, 6 and 12, and then through the coil of the electro-magnet 20 to the other terminal T. The discharge current passing between the anode 2 and the cathode 3 and through the coil of the electro-magnet 20 is large enough to energize the same and attract the armature 17 thereby breaking its contact with the contact member 18 so that the current flowing through the resistance 16 is broken. In the preferred construction, then, automatic means is provided to disconnect the circuit through the entire resistance 16 as soon as the tube is ignited. After the tube is once started, the sliding contact arm 19 may be moved to the left to decrease the tension between the auxiliary electrode 9 and the cathode 3.

Figure 2:
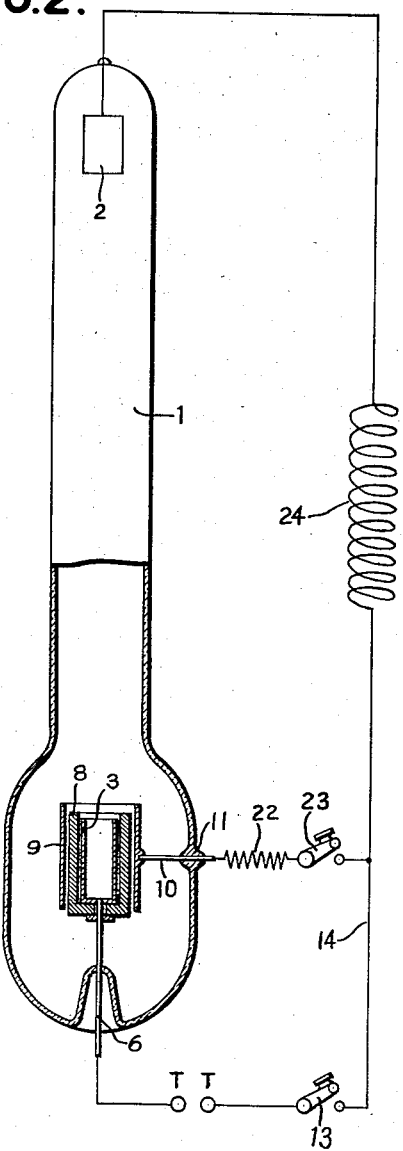
Figure 2 shows a view of a modified construction of the tube of the invention in which the incandescent cathode lacks the supporting member of high thermal capacity as well as lacking the automatic switching mechanism for the electrical connections with the auxiliary electrode, as shown in Figure 1.

In Figure 2 is shown a construction somewhat similar to that shown in Figure 1 but several parts included in the construction of Figure 1 have been eliminated. In this construction the refractory material, such as the cylindrical member 8, surrounds the incandescent cathode 3 and the auxiliary electrode 9 surrounds both the cathode and the cylindrical member 8.

The auxiliary electrode 9 of Figure 2 also utilizes a different electrical connection from that shown in Figure 1 in that it is connected through a resistance 22 and a switch 23 to the wire 14 instead of utilizing automatic switching means of Figure 1. It will be appreciated that the members 24 and 15 act as resistances or impedances where the current is direct and pulsating or alternating, respectively. In the present invention alternating current may be used by having double cold anodes or by having both cathode and anode constructed like the cathodes shown in Figures 1 and 2.

The discharge tube of Figure 2 is operated by closing the switch 13 which applies the electrical potential to the anode 2. This potential, however, is not sufficiently high to start the tube. The switch 23 is then closed which applies the electrical potential to the auxiliary electrode 9. As discussed with respect to the construction of Figure 1, the auxiliary electrode 9 is adjacent to the cathode 3 so that this potential is sufficient to start a discharge between the electrode 9 and cathode 3 which discharge heats the cathode 3 to incandescence. Now with an incandescent cathode 3 the cathode drop is reduced so that the electrical potential necessary in order to start a discharge between the anode 2 and the cathode 3 is sufficiently reduced thereby so that the discharge starts therebetween. When the tube begins operating, the switch 23 may be opened to disconnect the auxiliary electrode from the electrical potential and the incandescent cathode remains incandescent as a result of the normal discharge between the anode 2 and cathode 3.

The switches 13 and 23 can be joined together into one single switching device which will function to first connect these two switches to the source of potential at the same time and then with the same motion interrupting the switch 23 after a contact of sufficient duration to ignite or start the tube. The reverse of these movements may be used to disconnect the tube and cause its extinction.

It will be observed that the invention comprises broadly a method and apparatus for reducing the electric field around the cathode and preventing bombardment by positive ions or reducing the velocity of such ions which tend to be hurled with great velocity at the cathode.

This effect is obtained not only by providing a hollow cathode with an emissive coating on the interior thereof but also by providing an auxiliary electrode the potential of which aids in protecting the hot cathode against positive ion bombardment, this auxiliary electrode acting to increase emission from the hot cathode and reduce the momentum of positive ions hurled at the cathode.

What is claimed is:

1. A luminous tube comprising a thermionic cathode at one end of the tube, a supporting member having a high thermal capacity carrying the thermionic cathode, a nickel wire secured to the supporting member, a lead-in wire connected to the nickel wire, an anode at the other end of the tube, and a conducting medium within the tube.

2. A luminous tube comprising a thermionic cathode at one end of the tube, a supporting member having a high thermal capacity carrying the thermionic cathode, a nickel wire secured to the member, a lead-in wire connected to the nickel wire, a cylindrical member formed of refractory material surrounding the hot cathode, an anode at the other end of the tube, and a conducting medium within the tube.

3. A luminous tube comprising a thermionic cathode at one end of the tube, a supporting member having a high thermal capacity carrying the thermionic cathode, a nickel wire secured to the member, a lead-in wire connected to the nickel wire, a cylindrical member formed of refractory material surrounding the hot cathode and carried by the supporting member, an anode at the other end of the tube, and a conducting medium within the tube.

4. A luminous tube comprising a thermionic cathode at one end of the tube, an iron member having a high thermal capacity carrying the thermionic cathode, a nickel wire secured to the iron member, a lead-in wire connected to the nickel wire, an anode at the other end of the tube, and a conducting medium within the tube.

5. A luminous tube comprising an electrode at each end of the tube, a thermionic cathode at the other end of the tube, a cylindrical member of refractory material surrounding the cathode, an auxiliary electrode within the tube surrounding the cathode and cylindrical member, a resistance shunting the tube, and automatic switch means for disconnecting the resistance upon the discharge current passing between the anode and cathode, means connecting the auxiliary electrode with the resistance at a point intermediate its ends, and a conducting medium within the tube.

6. A luminous tube comprising an electrode at each end of the tube, a thermionic cathode, a cylindrical member of refractory material surrounding the cathode, an auxiliary electrode within the tube surrounding the cathode and cylindrical member, a resistance shunting the tube, and automatic switch means for disconnecting the resistance upon the discharge current passing between the anode and cathode, means having sliding contact with the resistance and connecting the auxiliary electrode with the resistance at a point intermediate its ends, and a conducting medium within the tube.

7. A luminous tube comprising an electrode at each end of the tube, a thermionic cathode, a supporting member having a high thermal capacity carrying the thermionic cathode, a lead-in connection to the supporting member, a cylindrical member of refractory material surrounding the cathode, an auxiliary electrode within the tube surrounding the cathode and cylindrical member, a resistance shunting the tube, and automatic switch means for disconnecting the resistance upon the discharge passing between the anode and cathode, means connecting the auxiliary electrode with the resistance at a point intermediate its ends, and a conducting medium within the tube.

8. A luminous tube comprising an electrode at each end of the tube, a thermionic cathode, a supporting member having a high thermal capacity carrying the thermionic cathode, a lead-in connection to the supporting member, a cylindrical member of refractory material surrounding the cathode and carried upon the supporting member, an auxiliary electrode within the tube surrounding the cathode and cylindrical member, a resistance shunting the tube, and automatic switch means for disconnecting the resistance upon the discharge passing between the anode and cathode, means connecting the auxiliary electrode with the resistance at a point intermediate its ends, and a conducting medium within the tube.

In testimony whereof, I affix my signature.

GEORGES CLAUDE.